United States Patent [19]

Kurihara et al.

[11] 3,993,625

[45] Nov. 23, 1976

[54] PERMSELECTIVE POLYMERIC MEMBRANES OF ORGANIC POLYAMIDE OR POLYHYDRAZIDE

[75] Inventors: Masaru Kurihara; Kojuro Ikeda; Noriaki Dokoshi, all of Otsu; Akio Kobayashi, Kusatsu, all of Japan

[73] Assignee: Toray Industries, Inc., Tokyo, Japan

[22] Filed: May 22, 1974

[21] Appl. No.: 472,446

[30] Foreign Application Priority Data

| | | |
|---|---|---|
| May 28, 1973 | Japan | 48-58595 |
| Mar. 7, 1974 | Japan | 49-25708 |
| Mar. 11, 1974 | Japan | 49-27164 |

[52] U.S. Cl. ........................ 260/47 CP; 210/500 M; 260/30.2; 260/30.6 R; 260/30.8 R; 260/32.2; 260/32.6 N; 260/47 CZ; 260/49; 260/63 R; 260/65; 260/78 R; 260/78 A; 260/78 TF; 260/78.41; 260/79.3 M; 260/823; 260/857 R

[51] Int. Cl.[2] .................. C08G 69/12; C08G 69/32; C08G 73/08

[58] Field of Search ............ 260/78 R, 78 A, 78 TF, 260/47 CP, 47 CZ, 49, 79.3 M, 63 R, 65, 78.4 R, 823, 857 R; 210/500 M

[56] References Cited

UNITED STATES PATENTS

| | | | |
|---|---|---|---|
| 3,386,965 | 6/1968 | Huffman et al. | 260/78 |
| 3,541,054 | 11/1970 | Takekashi | 260/78 |
| 3,637,594 | 1/1972 | Gallus et al. | 260/47 |
| 3,669,928 | 6/1972 | Lorenz et al. | 260/47 |
| 3,816,303 | 6/1974 | Wrasidlo | 210/23 |
| 3,835,207 | 9/1974 | Frost et al. | 264/41 |

*Primary Examiner*—Lester L. Lee

[57] ABSTRACT

Permselective membranes are prepared from novel synthetic organic aromatic or alicyclic polyamides or polyhydrazides of the formula

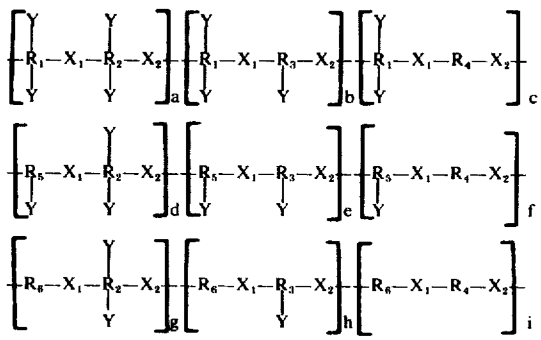

The membranes are useful in separating components of fluid mixtures or solutions such as water containing dissolved salts or lactam.

7 Claims, No Drawings

PERMSELECTIVE POLYMERIC MEMBRANES OF ORGANIC POLYAMIDE OR POLYHYDRAZIDE

BACKGROUND OF THE INVENTION

1. Field of the Invention

The present invention relates to a permselective thin membrane prepared from an organic polyamide having specific repeating units in the polymer main chain. Such membranes are useful for reverse osmosis or ultrafiltration. More particularly, this invention is useful for desalination of sea water or brackish water, and functions to separate waste materials which are the origin of environmental pollution from waste waters, such as products of dye or pulp industries, for example.

2. Description of the Prior Art

The term "osmosis" is commonly used to describe the spontaneous flow of pure water into saline water, where pure water and saline water are separated by a suitable semi-permeable membrane.

The term "reverse osmosis" is used to describe water flow from saline water into pure water through a membrane when hydrostatic pressure is applied to saline water in excess of equilibrium osmosis pressure. When the saline solution is in contact with the permselective membrane the saline water actually becomes concentrated. Generally, this reverse osmosis process is useful to desalinate sea water and may be applied to waste water treatment and to concentration of food. In the separation of water from such an aqueous solution, the reverse osmosis process has several advantages including operation with low energy expenditures and at room temperature. This is because the water undergoes no phase change, such as from liquid to vapor, as may occur in a distillation process, for example.

Accordingly, the reverse osmosis process is particularly useful for separating materials such are sensitive to deterioration by heat. This process also has merit in that miniaturization of equipment is possible. So it may be said that the reverse osmosis process is the most promising one compared to other processes, and extensive research has been performed on it in the United States.

It is known that a cellulose acetate membrane, developed by Loab and Coworkers and described in U.S. Pat. Nos. 3,133,132 and 3,133,137 is useful for carrying out the reverse osmosis process. However, cellulose acetate membranes have serious deficiencies in that they have a limited operating life and are easily hydrolyzed (deacetylated) in turn during operation, which prohibits their widespread application. In recent years, alternate permselective membrane materials have been actively sought and suggested. For example, membranes from polyacrylonitrile, polyhydroxyethylacrylate, polyvinylalcohol and polyvinylidene carbonate have been suggested. However, these membranes are inferior to cellulose acetate membranes in permselectivity and in water permeability as well.

More recently, the applications of new polymeric materials developed for thermalstable polymers such as aromatic polyamides, polyamide-hydrazides, polysulphones, polyphenylene oxides, for permselective membranes, have been actively tried. For example, aromatic polyamide and polyamide-hydrazide membranes are described in U.S. Pat. No. 3,567,632 and in Am. Chem. Soc. Polymer Preprints 16, No. 2,365,385 (1972). These membranes exhibit improved properties, both mechanical and chemical, during operation in comparison with those of cellulose acetate. However, they have "low water flux" because of their low permeability to water.

Polysulphones and polyphenylethers themselves are not good materials for reverse osmosis, but introduction of hydrophilic groups into the polymer main chain makes them useful as permselective membranes, according to the description in Am. Chem. Soc. Polymer Preprints 16, No. 2, 276 (1972).

In spite of their improved mechanical and chemical properties, however, their permselectivity and permeability are still inadequate in comparison with cellulose acetate. Accordingly, efforts have been made without success to obtain a membrane having high water-flux and low salt passage, and having improved mechanical and chemical properties.

DESCRIPTION OF THE INVENTION

It has now been discovered that an excellent permselective membrane of high water-flux and low salt passage, which is particularly useful for desalination of sea water and brackish water, can be prepared from synthetic organic polyamides or polyhydrazides represented by the formula:

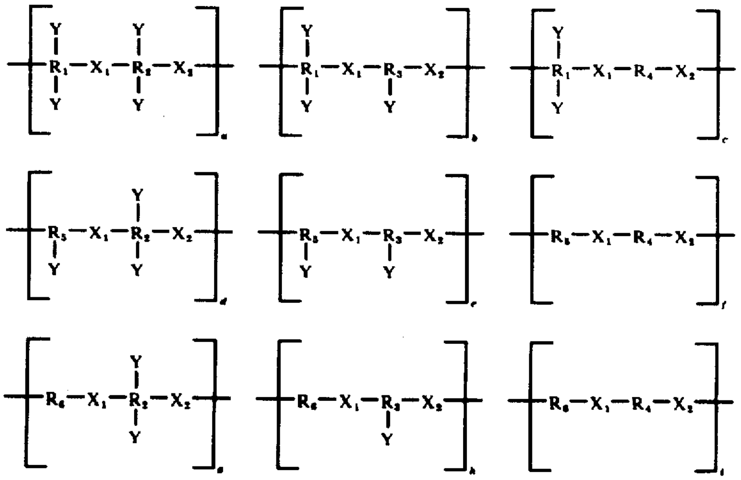

[I]

wherein a. *a, b, c, d, e, f, g, h,* and *i* represent the molar fraction (%) of each component, each being larger than zero or equal to zero, and satisfying the following relations:

$$a+b+c+d+e+f+g+h+i=100$$

$$a+b+c+d+e+f+g+h>0$$

b. $R_1$, $R_2$, $R_3$, $R_4$, $R_5$, and $R_6$ are members selected from the group consisting of aromatic, heterocyclic, and alicyclic groups having 4 to 30 carbon atoms, c. $X_1$ is a group selected from the class consisting of —NHCO—, —CO— and —CONHNHCO—, wherein, in the case of —CO—, it is bonded directly to a nitrogen atom in the heterocycle in $R_1$, $R_5$, or $R_6$, d. $X_2$ is a group selected from the class consisting of —CONH—, —CO—, and —CONHNHCO—, wherein, in the case of —CO—, it is bonded directly to a nitrogen atom in the heterocycle in $R_1$, $R_5$, or $R_6$, e. Y is a group selected from the class consisting of —COOH, $—SO_3H$, and a carboxylic salt or sulfonic salt of an alkali metal, alkaline earth metal, an organic amine * salt and mixtures thereof,

*(such as methylamine, ethylamine, propylamine, butylamine, aniline, cyclohexylamine, ethanolaine, p(m)-phenylenediamine, benzidine, p(m)-oxyaniline, 4,4'-diphenylether diamine, and methylenebisaniline)

and f. the polymer has a molecular weight high enough to provide a film.

components according to the usual polycondensation or polyaddition polymerization method, for example, described in "Condensation Polymers by Interfacial and Solution Methods" by. P. W. Morgan, Interscience Publishers (1965). The aromatic, heterocyclic, or alicyclic amine or hydrazide components used in the present invention are represented by the following formula:

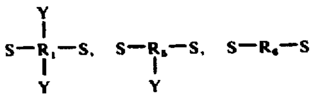

(II) (III) (IV)

wherein $R_1$, $R_5$ and $R_6$ are aromatic, heteroyclic, or alicyclic groups having 4 to 30 carbon atoms, *Y* is a group selected from the class consisting of —COOH, $—SO_3H$ and carboxylic or sulfonic salts of alkali metals, alkaline earth metals, organic amine salts and mixtures thereof, and S is a functional group which has the capability to react with the acid component and is selected from the class consisting of $—NH_2$, $—CONHNH_2$, and hydrogen radical wherein said hydrogen radical is bonded to an N atom in the heterocyclic amine component. Representative examples of $R_1$ are:

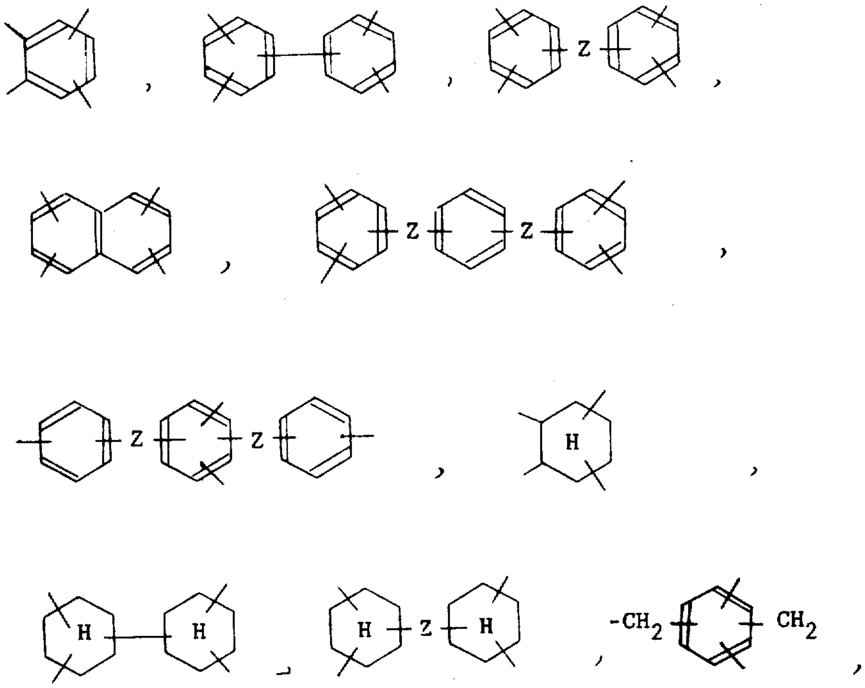

and tetravalent groups containing five or six-membered heterocycle(s) wherein Z is a group selected from the class consisting of an alkylene group (straight or branched chain) of 1–4 carbon atoms, —O—, —NH—, $—SO_2—$, —S—, —CONH—, —COO—, and —NHCOO— which is bound directly to the aromatic or alicyclic nuclei. Representative five or six-membered heteroxycles above mentioned are heterocycles having

1. Description of the Aromatic or Alicyclic Polyamide and Polyhydrazide

The aromatic or alicyclic polyamide and polyhydrazide used to prepare the permselective barriers of this invention can be manufactured by reacting aromatic, heterocyclic, or alicyclic amine or hydrazide components with aromatic, heteroxyclic, or alicyclic acid 1-3 heteroatom(s) selected from O, N and S, such as those derived from imidazole, imide, oxadiazole, oxazole, triazole, thiaziazole, thiazole, benzoxazole, benzimidazole, benzthiazole, benzoxazinone, or quinoxaline.

Representative examples of $R_5$ are

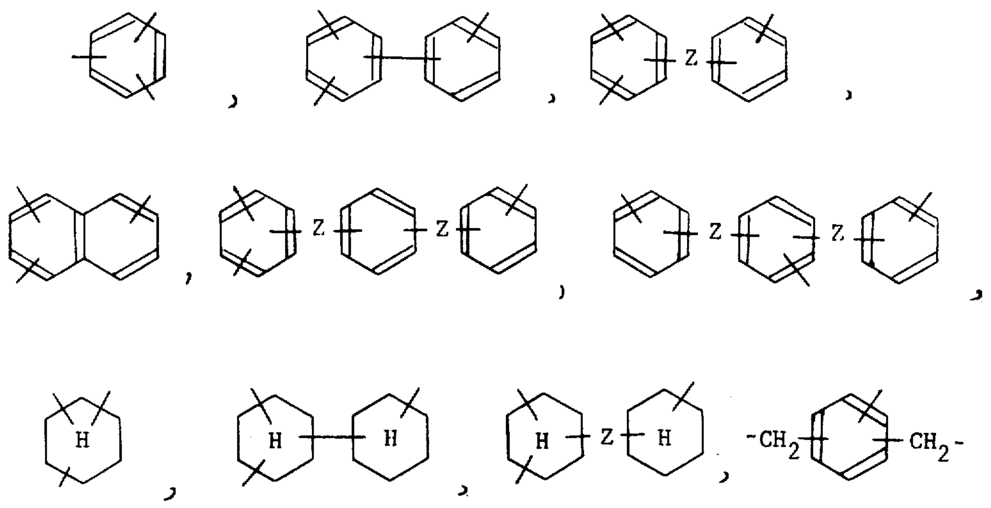

and trivalent groups containing five or six-membered heterocycle(s) wherein Z is the same group defined hereinbefore. Representative five or six-membered heterocycles are the same as those of $R_1$ mentioned above.

Representative examples of $R_6$ are:

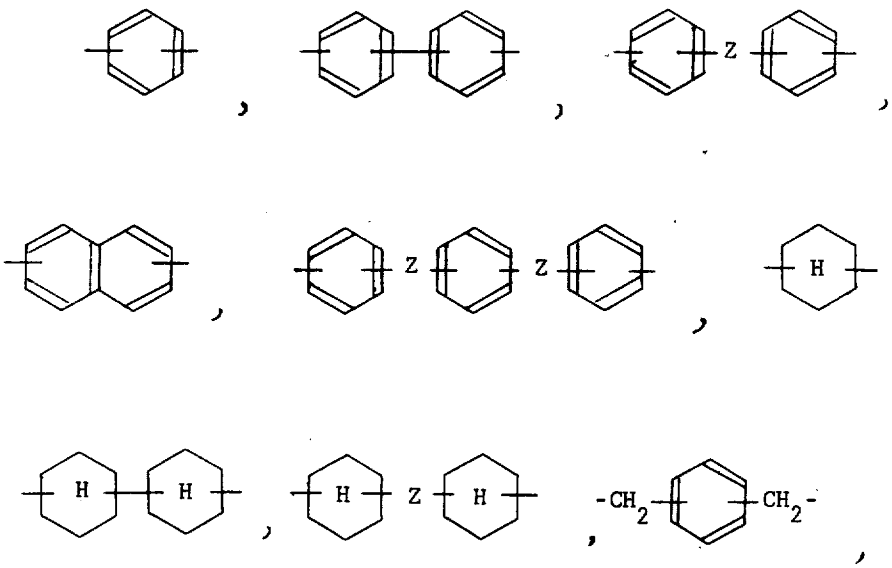

and divalent groups containing five or six-membered heterocycle(s) wherein Z is the same group defined hereinbefore.

Representative five or six-membered heterocycles are the same as those of $R_1$ mentioned above.

In the representative examples of $R_1$, $R_5$ and $R_6$ described above, aromatic or alicyclic nuclei can be substituted by lower alkyl, alkoxyamine, hydroxyl, amino, mono- or di-alkylamino, carboxamide, halogen (F, Cl, Br or I) or trialkyl ammonium ($C_1$ – $C_3$) groups.

Preferred amine components represented by the formula [II] are:

m (or p)-dicarboxyl phenylenediamine, methylenebis-anthranic acid, 3,3'-dicarboxy benzidine, 3,3'-dicarboxy-4,4'-diamino biphenyl ether, 3,3'-disulfonic-4,4'-diaminodiphenyl methane, and 3,3'-disulfonic benzidine.

Preferred amine components represented by the formula [III] are:

2-carboxy-m (or p)-phenylene diamine, 3-carboxy-m-phenylene diamine, 2-sulfonic-m-(orp)-phenylene diamine, 3-sulfonic-m-phenylene diamine.

Preferred amine components represented by the formula [IV] are:

m (or p)-phenylene diamine, methyl-m (or p)-phenylene diamine, benzidine, 4,4'-biphenyl ether diamine, methylenebis aniline, 3,3'-dichloro-4,4'-diaminodiphenyl methane, 3,3'-dioxybenzidine, 1,5-naphthalene diamine, 3,3'-dimethylamino-4,4'-diamino biphenyl ether, 3,3',4'-triamino biphenyl ether, 3,3',4,4'-tetramino biphenyl ether, N,N'-(4-aminobenzoyl)-m (or p)-phenylene diamine, 2,2'-bis(4-aminophenyl benzimidazole), 2,2'-bis(4-aminophenylbenzoxazole), 2,2'-bis (4-aminophenyl benzothiazole), m (or p)-xylylenediamine, 1,4-cyclohexyldiamine, 2,2-bis (4-amino phenyl) propane, piperazine, terephthaloylhydrazide, isophthaloylhydrazide, and m(or p)-aminophenylhydrazide.

The aromatic, heterocyclic, or alicyclic acid components used in the present invention are represented by the following formula:

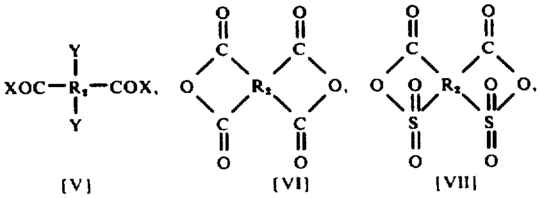

[V] [VI] [VII]

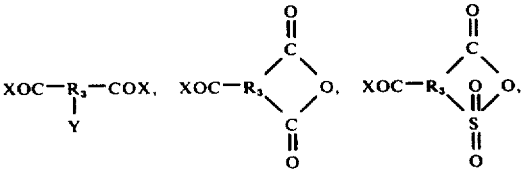

[VIII] [IX] [X]

$XOC-R_4-COX$

[XI]

wherein $R_2$, $R_3$ and $R_4$ are aromatic, heterocyclic, or alicyclic groups having 4 to 30 carbon atoms, X is a halogen radical, and Y is a group selected from the class consisting of —COOH, —$SO_3H$ and carboxylic or sulfonic salts of alkali metals, alkaline earth metals, organic amine salts and mixtures thereof.

Representative examples of $R_2$ are the same as $R_1$ shown hereinbefore.

Representative examples of $R_3$ are the same as $R_5$ shown hereinbefore.

Representative examples of $R_4$ are the same as $R_6$ shown hereinbefore.

In the acid components described above, [VI], [VII], [IX], [X], and [XI] are preferably used.

Preferred acid components represented by the formula [VI] are pyromellitic acid dianhydride, 3,4,3',4'-tetracarboxybenzophenone dianhydride, and naphthalene-1,4,5,8-tetracarboxylic acid dianhydride.

Preferred acid components represented by the formula [VII] are 2,4-disulfonic isophthalic acid dianhydride and 2,5-disulfonic terephthalic acid dianhydride.

Preferred acid components represented by the formula [IX] are: 4-chloroformyl phthalic acid anhydride, 5 (or 6)-chloroformyl naphthalene-2,3-dicarboxylic acid anhydride, 3' (or 4')-chloroformyl biphenyl-3,4-dicarboxylic acid anhydride, and 3'-chloroformyl benzophenone-3,4-dicarboxylic acid anhydride.

Preferred acid components represented by the formula [X] are:

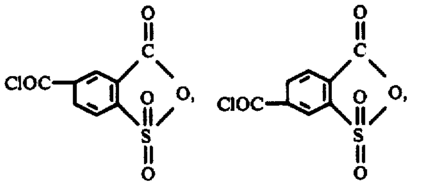

and

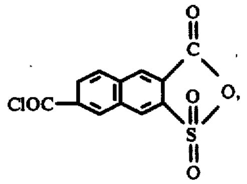

Preferred acid components represented by the formula [XI] are: isophthaloxy chloride, methyl isophthaloyl chloride, terephthaloxy chloride, methyl terephthaloyl chloride, bisbenzoic acid dichloride, diphenylmethane-4,4'-dicarboxylic acid dichloride, diphenylether-4,4'-dicarboxylic acid chloride, diphenylpropane-4,4'-dicarboxylic acid dichloride, and 2,6 (1,5 or 1,4)-naphthalene dicarboxylic acid dichloride.

A most characterizing feature of the polyamides and polyhydrazides of the present invention is the existence of the particular pendent groups which have been designated "Y" herein. Their existence unexpectedly increases the durability of the membrane as well as its permselectivity.

It is preferable in practicing the present invention that the following relationships be satisfied, in addition to requirement (a) described hereinbefore:

$$a+c+d+e+f+g+h+i>0$$

$$a+b+c \geqq 20$$

In this preferred range, the polymers which satisfy the following relationships are generally used:

$$c+i=100$$

$$100 \geqq C \geqq 20$$

Another preferred range according to the present invention is the range defined by the following relationships:

$$h + i = 100$$

$$95 \geqq h \geqq 20$$

The following range is also preferable.

$$f + i = 100, 100 \geqq f \geqq 35$$

The manufacture of the polymer in the present invention is usually achieved by solution polymerization. The solvents to be used in the polymerization are preferably those which do not react with said amines, hydrazides and acids, and which dissolve at least one of these reactants. Such solvents include dimethyl formamide, dimethyl acetamide, diethyl acetamide, N-methyl pyrrolidone, N-methyl caprolactam, tetramethyl urea, pyridine, dimethyl sulfone, hexamethyl phosphoramide, tetramethyl sulphone, formamide, butylolactone and N-acetyl pyrrolidone, used either separately or in combination. It is also possible to add benzene, toluene, nitrobenzene, chlorobenzene, dioxane, cyclohexanone, or tetrahydrofuran.

To prevent the polymer product from decreasing in viscosity owing to hydrolysis during polymerization, the solvent must be used in a substantially anhydrous condition as far as possible.

The organic solvent should be present in an amount sufficient to dissolve the reactants. Usually, the solvent is used in such amounts that the reactants are contained in an amount of 0.05% by weight of 50% by weight. The reaction product system, wherein the compound of Formula (I) is formed, may be utilized directly for the formation of polyamide or polyhydrazide without specifically separating the compound of Formula (I).

The reaction temperature is not particularly restricted so long as it is sufficient to induce polymerization.

Usually, it is advantageous to use a temperature of about −40° to 130° C, at which at least about 50% of the resulting polymer can be maintained as a polyamide or polyhydrazide chain without occurrence of a ring-closure reaction. The preferable reaction temperature is in the range from −20° to 60° C. From the resulting polymer solution, polymer can, if desired, be separated by the use of a non-solvent for the polymer, such as cyclohexanone, benzene, methanol, or dioxane. The viscosity values mentioned in the examples which follow were measured with the use of a dried polymer separated accordingly, unless otherwise described.

It is possible to add an inorganic salt or an organic base to the solvent to increase the solubility of the polymer in the solvent and to maintain the homogeneity of the polymer solution. As the inorganic salts, lithim chloride, calcium chloride, magnesium carbonate, and zinc chloride are preferably used.

As the organic base, pyridine, tetramethylene diamine, γ-picoline, quinoline, hexamethylguanidine, triethylamine, tripropylamine, and N,N-dimethylaniline are preferably used.

In the resultant polymer, the free —COOH and $—SO_3H$ groups are changed partially or entirely to the metal salts of carboxylic acid and sulfonic acid after addition of inorganic salt and/or organic amine, during or after polymerization. Generally, the alkali metal (in particular, lithium) salt or alkaline earth metal salt of said —COOH or $—SO_3H$ group of the polymer is preferably used. The addition of an organic monoamine or diamine which is mainly primary or secondary amine after polymerization, results in an increase in the hydrophilicity of the polymer, and in an increase in the permselectivity of the polymer to water.

As such primary and secondary amines, the usual organic amines are useful including the diamines, triamines and tetramines hereinbefore referred to as examples of the amine components.

The molecular weight of said polymer is generally in the range of about 3000–100,000, preferably in the range of about 5,000–50,000 from a practical standpoint.

2. Permselective Barriers

As used herein, the exmpression "permselective" has the usual connotation of the ability preferentially to permeate certain component(s) of a fluid mixture while simultaneously restraining other component(s). For the purpose of the present invention, which is primarily concerned with aqueous solution separation, a barrier is considered permselective when it exhibits both a water permeability (Wm) of at least about 1000 and a solute passage of less than about 20%. These parameters are more fully defined hereinafter. As used herein, the term "Desalination" applies particularly to those permselective barriers and reverse osmotic processes wherein the solute to be preferentially rejected is a dissociated salt, e.g., NaCl, $Na_2SO_4$, $CaCl_2$, etc.

The polymeric permselective barriers of this invention may take many forms, e.g., thin coatings on porous substrates, thin films supported by porous substrates, etc. The porous substrates, in turn, may be shaped as tubes (supporting either internal or external barriers), flat plates, corrugated sheets, etc., as known in the art.

A particularly preferred variety of permselective barrier especially useful for aqueous desalination applications is an asymmetric membrane, which is a monolithic structure having a thin, relatively dense skin overlying a relatively porous substrate, although the transition from one region to the other may be more or less gradual and continuous.

The thickness of the polyamide or polyhydrazide membrane for reverse osmosis is generally less than 200μ, preferably 10–120μ. When the thick membrane is used efficiency is reduced, although reverse osmosis occurs.

3. Asymmetric Membrane Preparation

The permselective barriers of this invention may preferably be prepared in asymmetric membrane form by rinsing a "Protomembrane". The process for preparing such membrane comprises the step of a. Casting a dope or a plate or drum, b. Partially drying, and c. Rinsing with a rinse medium wherein said dope consists essentially of a. about 5 to 35% (based on the weight of the solvent and polymer) by weight of the organic aromatic polyamide or polyhydrazide represented by the formula [I] as set forth hereinbefore, b. about 60 to 90% by weight of an organic polar solvent for the polymer based on the weight of the solvent and polymer, c. about 1 to 20% by weight of an inorganic salt or organic amine based on the weight of the polymer, and d. not more than 10% by weight of water based on the weight of the polymer.

Said organic solvent for the polymer includes any organic polar solvent or organic polar solvent mixture which dissolves the polymer at or below room temperature, which has a boiling point in the range of about 50°–250° C, and which is easily miscible with the rinse medium which may be water, for example. Especially preferred water miscible, dipolar, organic solvents include dimethylformamide, dimethylacetamide, N-methyl-2-pyrrolidone, dimethylsulfoxide, hexamethyl phosphoramide and mixtures thereof. The inorganic salts preferably contained in said dope include lithium chloride, lithium bromide, lithium nitrate, calcium chloride, magnesium chloride, etc.

Preferable organic amines contained in said dope include methylamine, ethylamine, propylamine, butylamine, aniline, cyclohexylamine, ethanolamine, p-phenylenediamine, m-phenylenediamine, 4,4'-biphenylether diamine, benzidine, p(or m)-oxyaniline, and methylenebis aniline.

Said dope is cast on a plate or drum at about 5° to 50° C in any effective thickness.

Partial drying of the formed dope on a plate or drum is conducted by evaporation of solvent at 50°–140° C for a sufficient time to remove about 40% to 90% of the solvent. The term Protomembrane is used herein to designate a shaped structure of the formed dope after evaporation. Useful permselective asymmetric membranes are obtained by rinsing the protomembrane with a rinse medium which is essentially a non-solvent for the polymer, which is chemically inert to the polymer, and which dissolves inorganic salts and organic amines in the dope and is miscible with organic solvents. In the rinsing step most of the solvent and inorganic salt etc. are extracted. Suitable rinse media include water, methanol, ethanol, ether, hydrocarbons, halogenated hydrocarbons and mixtures thereof, with or without inorganic salts such as lithium chloride, calcium chloride etc.

The preferred rinse medium is water or water with an inorganic salt.

The protomembrane should be in contact with the rinse medium for sufficient time to extract at least about 80% of the inorganic salt and organic amine, and at least about 80% of the solvent, generally at about 0°–50° C for about 1 hour. The asymmetric membrane thus obtained has an especially unique characteristic, for desalination purposes: the separation of micro molecules such as sodium chloride included in sea water. The step of rinsing may be conducted if necessary, while applying tension to the membrane to eliminate shrinkage. If it is necessary to change the permeation properties of the membrane in order to use the membrane for a specified purpose, heat treatment of the protomembrane is effective. The heat treatment may be conducted, for example, by raising the temperature of the rinse medium up to about 50°–150° C. The thin membrane thus obtained has a skin layer on the surface of the membrane, which results in good permselectivity of the asymmetric membrane with the skin layer. The asymmetric membrane also has a porous layer which supports the skin layer and through which water can flow easily after passing through the skin layer. This conbination of skin layer and porous layer in the membrane is considered to be indispensable for purposes of reverse osmosis.

Such a structure can be obtained from polyamides or polyhydrazides of the present invention having specific repeating units and prepared by the process mentioned above.

The permselective membrane of this invention is useful for saline water conversion, or for water treatment such as concentration of aqueous lysine hydrochloride and aqueous lactam solutions, etc., with good efficiency compared to other membranes which have been developed for reverse osmosis. Another advantage of membranes of this invention is their stability against hydrolysis and resistance to biological attack. Moreover, practical operation is very easy and the equipment used may be small and economical.

4. Permselective Properties

The rate at which water passes through permselective barrier membranes is expressed herein either as "Water Permeability" (Wm) or "Water Flux" (Wf). Water Permeability is defined as the number of cubic meters of water per day which pass through a square meter of a membrane at an effective reverse osmosis pressure of 72 Kg/cm². It may be calculated by the equation:

$$\text{Water permeability} \quad Wm = \frac{\text{cubic meters of water permeated}}{\text{days} \times \text{sq. meters} \times \text{pressure (Kg/cm}^2\text{)}} \times 10^6$$

The pressure used in this calculation is the effective reverse osmosis pressure, that is ($\Delta p - \Delta\pi$) where $\Delta p$ is the difference in hydraulic pressure across the membrane and $\Delta\pi$ is the difference in osmotic pressures across the membrane. The number of square meters of membrane used in the water permeability calculation is based on the surface area of a flat film exposed to the feed water.

The related term Water Flux is defined by:

$$\text{Water flux} \equiv Wf = \frac{\text{Cubic meters of water permeated}}{\text{days} \times \text{sq. meters}}$$

It is stated in units of (m³/m² days)

= cubic meters/sq. meter day

The rate at which solute is rejected by a membrane is conveniently expressed in terms of percent solute rejection.

$$\text{Percent solute rejection} \equiv \text{percent Rej.} = \left(1 - \frac{\text{concentration of solute in permeate}}{\text{concentration of solute in feed}}\right)$$

In practice, the solute currently of most interest is dissolved salt, and the concentration of salt in the feed and the permeate may conveniently be determined conductometrically or by chemical analysis.

EXAMPLES

The present invention will be more clearly understood by reference to the following examples and comparative examples, but it is not intended that the invention be limited thereto.

All parts and percentages are by weight except where otherwise specified. All polymerization reactions were carried out in solution; usually cooled below room temperature, employing standard preparation techniques.

In the following, the inherent viscosity is a value represented by:

$$\text{Inherent viscosity} \equiv \eta\ \text{inh} = \frac{\text{natural logarithm}\ \dfrac{\text{flowing down time of the solution}}{\text{flowing down time of the solvent}}}{\text{concentration}}$$

where concentration is the number of grams of the polymer in 100 ml. of the solution.

The ordinary viscosity in these examples is based on a measurement at 30° C, in N-methyl-2-pyrrolidone at a concentration of 0.5 g/100 ml.

The ordinary reverse osmosis test in these examples was conducted under the following conditions except where otherwise specified.

pressure: 40 Kg/cm$^2$
feed concentration: 5000 ppm
pH: 7.0 ± 0.2
temperature: 25° C

COMPARATIVE EXAMPLE 1

A 108.14 g portion of purified m-phenylene diamine was dissolved into a 764 g portion of dimethylacetamide and a 464 g portion of propylene oxide in a nitrogen-blanketed vessel with vigorous stirring under cooling with an ice-bath, followed by addition of a 203.02 g portion of isophthaloyl chloride, and the vigorous stirring was continued for 2 hours at 20° C to obtain an extremely viscous polyamide solution.

The unreacted propylene oxide or by-product, propylenechlorohydrin, produced from the reaction of propylene oxide, with hydrogen chloride included in the polymer solution, was removed under vacuum.

The inherent viscosity of the polymer thus obtained was 1.30, and its chemical structure satisfied the relationship:

$i = 100$ in the formula [I] which is out of the range of the present invention. By using the polymer solution, the following dope composition was prepared: polyamide 15.0 (wt%), lithium chloride 5.0 (wt%), dimethylformamide 25.0 (wt%), and dimethylacetamide 55.0 (wt%). A portion of the dope was poured onto a glass plate, at 25° C and 68% humidity by using a 200μ blade doctor knife at a rate of 3 cm/sec., followed by drying the dope on the glass at 90° C for 5 minutes in a dryer having a circulating hot air system. The partially dried membrane protomembrane on the glass was dipped into water at 25° C for 1 hour. The membrane was peeled off when rinsing the protomembrane. The thickness of the membrane was 75μ. This membrane was fixed in a porous metal. Permeation tests were carried out by using ordinary water with 5000 ppm of NaCl, measured by a conductometer, at the pressure of 40 Kg/cm$^2$. The water flux was 0.14 m$^3$/m$^2$ day and the salt rejection was 94.5%.

COMPARATIVE EXAMPLE 2

As described in comparative example 1, the following copolymerization was conducted. From 100 mol % of m-phenylenediamine, 70 mol % of isophthaloyl chloride and 30 mol % of terephthaloyl chloride, a dimethyl acetamide solution of polyamide ( $\eta$ inh = 0.96) was obtained ($i$ = 100 in the formula [I]). A dope was made from the combination of 15% polyamide thus obtained, 5% dimethylformamide, 25% dimethylacetamide, and 5% lithium nitrate. A membrane was made according to the same procedure shown in comparative example 1 at 25° C and 72% humidity. A permeation test on this membrane having 80μ thickness was carried out by using a sodium chloride solution containing 5000 ppm of chloride ion at an applied pressure of 40 Kg/cm$^2$ with the same testing cell shown in comparative example 1. The water flux was 0.30 m$^3$/m$^2$ day and the chloride rejection was 99.0%.

COMPARATIVE EXAMPLE 3

According to the procedure described in comparative example 1, polyamidehydrazide was prepared from the following components ($i$ = 100 in formula [I]).

| | |
|---|---|
| amine component: | |
| m-phenylenediamine | 50 mol % |
| terephthalhydrazide | 50 mol % |
| acid component: | |
| isophthaloyl chloride | 50 mol % |
| terephthaloyl chloride | 50 mol % |

The inherent viscosity of the polymer was 1.45.

By using a solution of this polymer, a dope was made according to the procedure described in comparative example 1, and a membrane was prepared in accordance with the same procedure shown in comparative example 1. A permeation test on this membrane having 75μ thickness was carried out under ordinary evaluation conditions. The water flux was 0.32 m$^3$/m$^2$ day and the chloride rejection was 96.3%.

COMPARATIVE EXAMPLE 4

Polyhydrazide ( $\eta$ inh = 1.25) in N-methyl pyrrolidone was prepared from 100 mol % of isophthaloyldihydrazide, 70 mol % of isophthaloyl chloride and 30 mol % of terephthaloyl chloride. A dope was prepared according to the procedure described in comparative example 1, and a membrane having a thickness of 60μ was prepared under the same conditions shown in comparative example 2.

The water flux was 0.48 m$^3$/m$^2$ day and the salt rejection was 97.2%.

EXAMPLE 1

A 28.63 g portion of 3,3-methylene-bisanthranilic acid was dissolved into a 150 g portion of N-methyl-2-pyrrolidone and 46 g portion of propylene oxide with vigorous stirring.

After the solution was cooled to 0° C, a 20.30 g portion of isophthaloyl chloride was added dropwise to the solution at 0° C over a period of 1 hour. The solution became viscous and yellow and it yielded a polyamide after further vigorous stirring at room temperature ($\eta$ inh = 1.02, C = 100 in the formula [I]).

The unreacted propylene oxide and by-product, propylenechlorohydrin, were evaporated under vacuum to yield at 20% polymer solution.

By using this polymer solution, a dope having the following composition was prepared: polyamide 15.0 (wt%), lithium nitrate 5.0 (wt%), lithium chloride 1.5 (wt%), dimethylacetamide 55.0 (wt%), and dimethylformamide 23.5 (wt%). A protomembrane was prepared from this casting solution according to the same procedure shown in comparative example 1 except that it was dried at 120° C for 10 minutes.

The partly dried protomembrane on a glass surface was rinsed with water at 5° C for 1 hour. The membrane obtained was peeled off.

A permeation test of the membrane of 70$\mu$ thickness was carried out under ordinary conditions. The water flux was 1.02 $m^3/m^2$ day and the salt rejection value was 97.5%. The permeation test was continued for 1 month (at 25° C) in order to confirm the long term durability of this membrane. The results after 1 month were as follows:

| | |
|---|---|
| water flux: | 0.99 $m^3/m^2$ day |
| salt rejection: | 97.6% |

From this result it was ascertained that good permselectivity and permeability of this membrane remained unchanged for a long time and that the durability of this membrane under pressure was also excellent.

EXAMPLE 2

A 33.40 g portion of 3,3'-methylene-bisanthranilic acid and a 5.41 g portion of m-phenylenediamine were dissolved into a 210 g portion of N-methyl-2-pyrrolidone and a 77.4 g portion of propylene oxide below 20° C with vigorous stirring, followed by addition of a 16.9 g portion of isophthaloyl chloride and a 16.9 g portion of terephthaloyl chloride, and vigorous stirring was continued for 2 hours.

The unreacted propylene oxide or by-product described in comparative example 1 was removed under vacuum. The inherent viscosity of the polymer was 1.09. The molar fractions of the repeating units of this polymer represented by the formula [1] are:

C = 70 i = 30

By using this polymer, a dope and membrane were prepared according to the same procedure described in example 1. Results of permeation tests of a membrane of 85$\mu$ thickness were as follows:

| | |
|---|---|
| water flux: | 0.78 $m^3/m^2$ day |
| salt rejection: | 98.5% |

EXAMPLE 3

As described in example 2, a 100.64 g portion of 3,3'-dicarboxybenzidine, a 68.13 g portion of m-phenylenediamine, a 21.06 g portion of 4-chloroformylphthalic anhydride and a 182.72 g portion of isophthaloyl chloride were copolymerized, and a 20% of copolyamide solution in a 1:1 mixture of N-methyl-2-pyrrolidone and dimethyl-acetamide were obtained.

The inherent viscosity of the polymer was 1.04, and the molar fractions of its repeating unit were:

b = 3.7, C = 33.3 h = 6.3, i = 56.7

A membrane of 85$\mu$ thickness was prepared under the same conditions shown in comparative example 2. The permeation test was carried out by using a sodium chloride solution containing 5000 ppm of chloride at an applied pressure of 60 $Kg/cm^2$. The water flux was 0.70 $m^3/m^2$ day and the salt rejection was 98.5%.

By using the same membrane, the permeation tests were carried out by using sea water (collected at Wakasa Gulf in the Japan Sea) with 35,000 ppm, measured by a conductometer, at a pressure of 105 $Kg/cm^3$. The water flux was 0.92 $m^3/m^2$ day and the salt rejection was 99.5%. The permeated water was essentially useful for both drinking water and industrial water.

EXAMPLE 4

As described in example 1, a 98.80 g portion of 3,5-diamino benzoic acid, a 37.84 g portion of p-phenylenediamine, a 101.51 g portion of isophthaloyl chloride, and a 101.51 g portion of terephthaloyl chloride were copolymerized, and a copolyamide having carboyxlic groups was obtained. The inherent viscosity was 1.25. The molar fraction of the repeating units of the polymer were:

f = 65, i = 35

A membrane of 100$\mu$ thickness was prepared under the same conditions shown in example 2.

The water flux was 0.89 $m^3/m^2$ day and the salt rejection was 97.6%.

To a part of the dope prepared as above, an equimolar amount of p-phenylenediamine to the carboxylic groups in the polyamide was added, and a new dope was obtained. From this new dope, a membrane was prepared under the following conditions:

| | |
|---|---|
| drying: | 120° C/10 minutes |
| rinsing: | 5% $CaCl_2$ aqueous solution, rinsed at 5° C |

The permselectivity and durability of the membrane were examined and compared to those of a membrane obtained from a dope to which amine salts were not added. The results are shown in Table 1.

Table 1

| | Amine | Added | Not Added |
|---|---|---|---|
| Water Flux ($m^3/m^2$ day) | Initial | 0.95 | 0.85 |
| | After 1000 hrs. | 0.89 | 0.75 |
| Salt Rejection (%) | Initial | 97.4 | 97.5 |
| | After 1000 hrs. | 97.5 | 97.6 |

EXAMPLES 5–25

Reverse osmosis tests were run under the same conditions shown in Example 2 by using the different combinations of polyamides or polyhydrazides of this invention as is shown in Table 2. The results are reported in Table 3.

TABLE 2

STRUCTURE OF REPEATING UNITS ( ) means mole ratio

| Example No | Amine Compounds | | | | | Acid Compounds | | | | $X_2$ | Molar Fraction of Repeating Unit (%) |
|---|---|---|---|---|---|---|---|---|---|---|---|
| | $R_1$ | $R_5$ | $R_6$ | Y | $X_1$ | $R_2$ | $R_3$ | $R_4$ | Y | | |
| 5 |  (50) | | 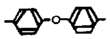 (50) | COOH | NHCO |  (5) | |  (95) | COOH | CONH | a : 2.5<br>c : 47.5<br>g : 2.5<br>i : 47.5 |
| 6 | 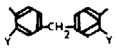 (70) | |  (30) | $SO_3H$ | NHCO | | | 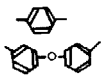 (90) (10) | — | CONH | c : 70<br>i : 30 |
| 7 | 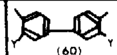 (60) | | 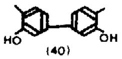 (40) | COOH | NHCO | | 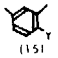 (15) |  (85) | COOH | CONH | b : 9<br>c : 51<br>h : 6<br>i : 34 |
| 8 | 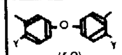 (50) | |  (50) | COOH | NHCO (75)<br>CONHNHCO (25) | | 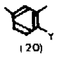 (20) |  (80) | $SO_3H$ | CONH (75)<br>CONHNHCO (25) | b : 10<br>c : 40<br>h : 10<br>i : 40 |
| 9 | | 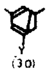 (30) |  (70) | COOH | NHCO (30)<br>CONHNHCO (70) | | 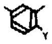 (10) | 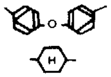 (70) (20) | COOH | CONH (30)<br>CONHNHCO (70) | e : 3<br>f : 27<br>h : 7<br>i : 63 |
| 10 | |  (70) | 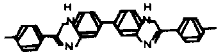 (30) | $SO_3H$ | NHCO | |  (5) | 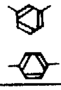 70 25 | COOH | CONH | e : 3.5<br>f : 66.5<br>h : 1.5<br>i : 28.5 |
| 11 | 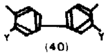 (40) | | 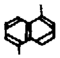 (60) | COOH | NHCO | | | 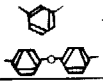 (30) 70 | — | CONH | c : 40<br>i : 60 |
| 12 | 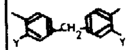 (50) | | 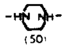 (50) | COOH | NHCO (50)<br>CO (50) | 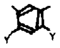 (10) | | 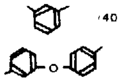 (40) (50) | COOH | CONH (50)<br>CO (50) | a : 5<br>c : 45<br>g : 5<br>i : 45 |
| 13 | | |  (100) | — | NHCO | | 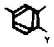 (64) |  (36) | COOH | CONH | h : 64<br>i : 36 |
| | | | 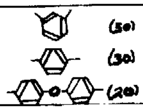 (50) (30) (20) | — | NHCO | | 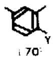 (70) |  30 | COOH | CONH | h : 70<br>i : 30 |

Table 2 (continued)

| Example No | Amine Compounds R1 | R5 | R6 | Y | X1 | Acid Compounds R2 | R3 | R4 | Y | X2 | Molar Fraction of Repeating Unit (%) |
|---|---|---|---|---|---|---|---|---|---|---|---|
| 15 | | | 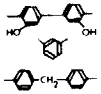 (30) (30) (40) | — | NHCO | | 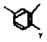 40 |  (60) | COOH | CONH | h = 40, i = 60 |
| 16 | | | 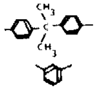 (60) (40) | — | NHCO | |  60 |  (40) | COOH | CONH | h = 60, i = 40 |
| 17 | | | 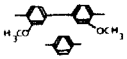 (60) (40) | — | NHCO | |  30 |  (70) | COOH | CONH | b = 30, i = 70 |
| 18 | 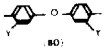 (80) | | 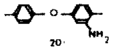 (20) | COOH | NHCO | 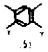 (5) | 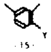 (15) |  (80) | COOH | CONH | a = 4, b = 12, c = 64, g = 1, h = 3, i = 16 |
| 19 | | | 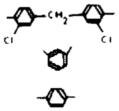 (70) (20) (10) | — | NHCO | 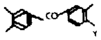 (10) | |  (70) (20) | COOH | CONH | g = 10, i = 90 |
| 20 | | | 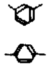 (40) (60) | — | CONHNHCO | |  (60) |  (40) | COOH | CONHNHCO | h = 60, i = 40 |
| 21 | | |  (70) (30) | — | NHCO | | 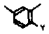 (25) |  (75) | $SO_3H$ | CONH | h = 25, i = 75 |
| 22 | | | 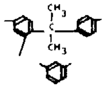 (80) (20) | — | NHCO |  (10) | 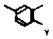 (20) |  (70) | $SO_3H$ | CONH | g = 10, h = 20, i = 70 |
| 23 | | | 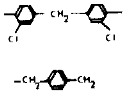 (80) (20) | — | NHCO | |  (60) |  (40) | $SO_3H$ | CONH | h = 60, i = 40 |
| 24 | 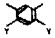 (40) | |  (60) | $SO_3H$ | NHCO | | 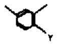 (50) |  (50) | COOH | CONH | b = 20, c = 20, h = 30, i = 30 |
| 25 | |  (10) |  (90) | COOH | NHCO | 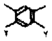 (10) | |  (90) | COOH | CONH | d = 1, f = 9, g = 9, i = 81 |

Table 3

| Example No. | Membrane Thickness (μ) | Permeation Test Salt Rejection (%) | Water Flux (m³/m² · day) |
|---|---|---|---|
| 5 | 80 | 98.5 | 0.62 |
| 6 | 75 | 94.5 | 1.18 |
| 7 | 90 | 96.5 | 0.89 |
| 8 | 80 | 97.2 | 0.96 |
| 9 | 100 | 98.5 | 0.77 |
| 10 | 112 | 96.5 | 1.12 |
| 11 | 95 | 96.2 | 0.61 |
| 12 | 92 | 96.5 | 0.92 |
| 13 | 75 | 98.0 | 1.08 |
| 14 | 65 | 97.5 | 1.12 |
| 15 | 100 | 98.5 | 0.87 |
| 16 | 120 | 99.5 | 0.56 |
| 17 | 85 | 97.9 | 0.79 |
| 18 | 72 | 95.5 | 1.16 |
| 19 | 76 | 98.6 | 0.89 |
| 20 | 75 | 97.5 | 1.15 |
| 21 | 82 | 98.5 | 0.78 |
| 22 | 90 | 96.4 | 0.57 |
| 23 | 68 | 96.5 | 0.97 |
| 24 | 72 | 97.1 | 0.78 |
| 25 | 70 | 95.8 | 0.98 |

What is claimed is:

1. A permselective polymeric membrane for use in desalination of saline water by reverse osmosis comprising contacting the saline water under pressure with a reverse osmosis membrane, consisting essentially of a synthetic organic polymer represented by the formula:

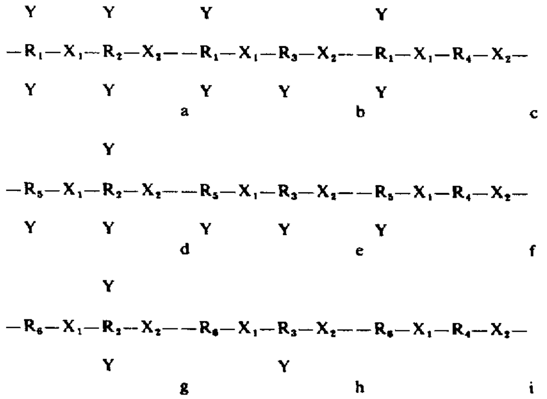

wherein:

a. $a$, $b$, $c$, $d$, $e$, $f$, $g$, $h$, and $i$ represent molar fraction (%) of each component, each of them being larger than zero or equal to zero, and satisfying the following relationship:

$$a+b+c+d+e+f+g+h+i=100$$

$$a+c+d+e+f+g+h+i>0$$

$a+b+c$ are equal to or greater than 20 b. $R_1$, $R_2$, $R_3$, $R_4$, $R_5$, and $R_6$ are members selected from the group consisting of aromatic groups, heterocyclic groups and alicyclic groups having 4 to 30 carbon atoms, c. $X_1$ is a group selected from the class consisting of —NHCO—, —CO—, and —CONHNHCO—, wherein, in the case of —CO—, it is bonded directly to a nitrogen atom in the heterocyclic ring in $R_1$, $R_5$, or $R_6$, d. $X_2$ is a group selected from the class consisting of —CONH—, —CO—, and —CONHNHCO—, wherein, in the case of —CO—, it is bonded directly to a nitrogen atom in the heterocyclic ring in $R_1$, $R_5$, or $R_6$, e. Y is a group selected from the class consisting of —COOH—, $SO_3H$ and carboxylic salts or sulfonic salts or alkali metals, alkaline earth metals, organic amine salts and mixtures thereof, and f. said membrane being asymmetric in thickness.

2. A membrane of claim 1 wherein the molar fraction is within the following relationship:

$$h+i=100$$

$$95 \geqq h \geqq 20$$

3. A membrane of claim 1 wherein the molar fraction is within the following relationship:

$$f+i=100$$

$$100 \geqq f \geqq 35$$

4. A membrane of claim 1 wherein the molar fraction is within the following relationship:

$$c+i=100$$

$$100 \geqq C \geqq 20$$

5. A membrane of claim 1 wherein

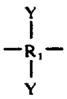

are represented by structures selected from the class consisting of

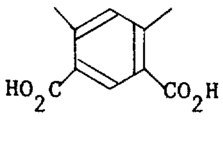 ,

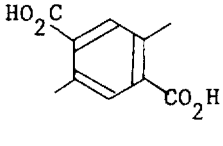 ,

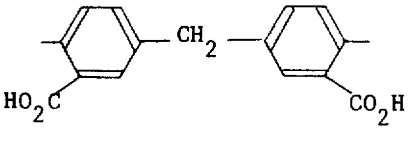 ,

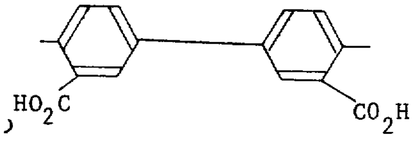 ,

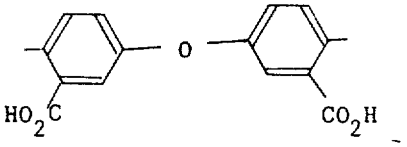, 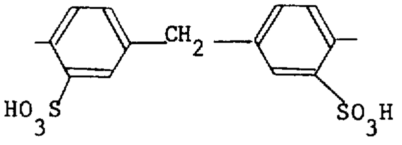,
and
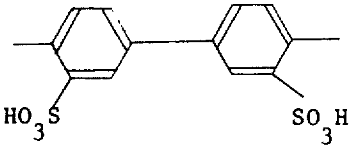
6. A membrane of claim 1 wherein
$$-\underset{\displaystyle Y}{\overset{|}{R_s}}-$$
are represented by structures selected from the class consisting of
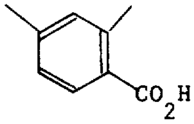,
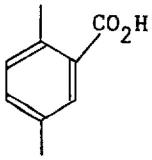,
-continued
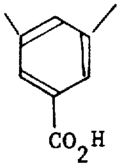,
and
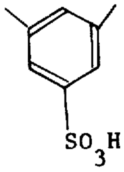.
7. A membrane as defined in claim 1, wherein the polymer (*i*) is present in an amount greater than zero and is admixed with a polymer selected from the group consisting of (*a*), (*b*), (*c*), (*d*), (*e*), (*f*), (*g*) and (*h*).
* * * * *